Figure 1:
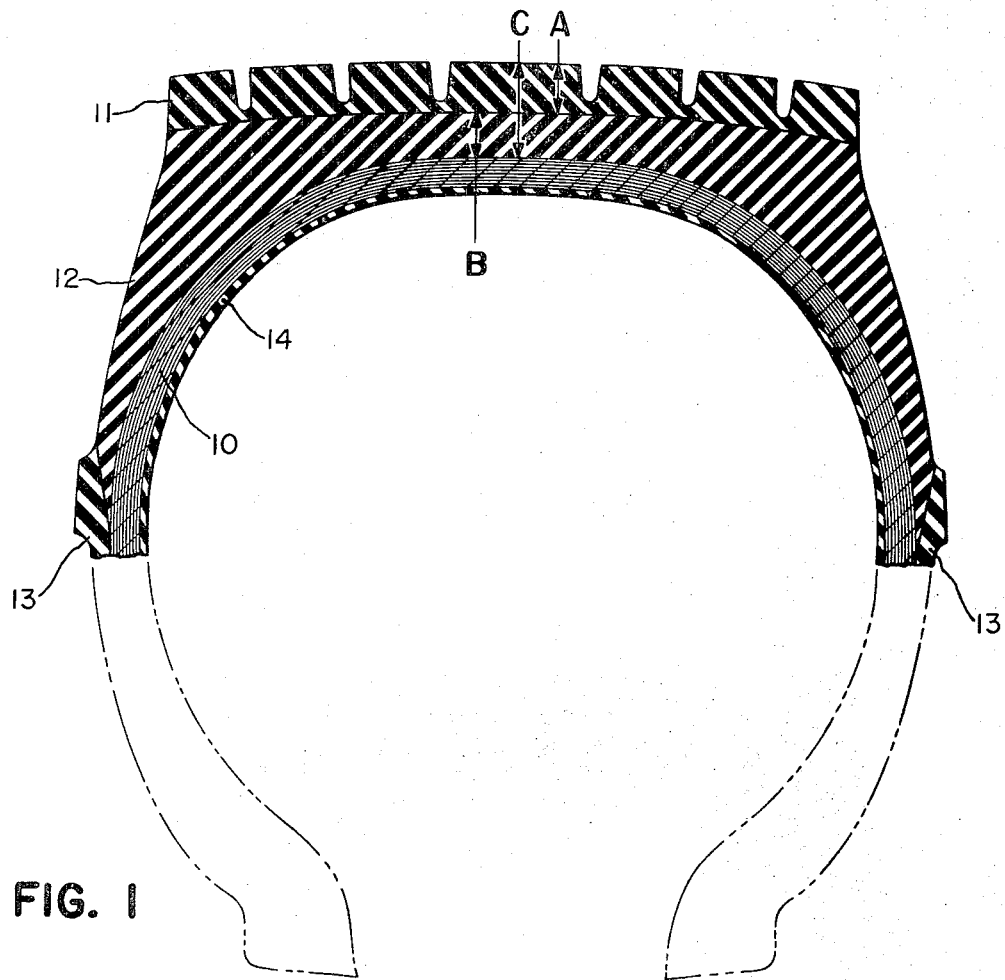

United States Patent [19]
Russell

[11] 3,830,275
[45] Aug. 20, 1974

[54] TREADS, PNEUMATIC TIRES AND A PROCESS FOR IMPROVING TIRE PERFORMANCE

[75] Inventor: Richard M. Russell, Danville, Va.

[73] Assignee: The Goodyear Tire & Rubber Company, Akron, Ohio

[22] Filed: Oct. 14, 1971

[21] Appl. No.: 189,418

Related U.S. Application Data

[63] Continuation of Ser. No. 869,126, Oct. 24, 1969, abandoned.

[52] U.S. Cl............. 152/357, 152/209 R, 156/96, 156/128 T, 152/330 R
[51] Int. Cl..... B60c 9/02, B60c 11/06, B29h 17/36
[58] Field of Search......... 156/128, 128 T; 152/330, 152/357, 374, 96, 209 R

[56] References Cited
UNITED STATES PATENTS

| | | | |
|---|---|---|---|
| 2,381,388 | 8/1945 | Tann | 156/128 T |
| 3,004,018 | 10/1961 | Naylor | 156/128 T |
| 3,157,218 | 11/1964 | Brown | 152/330 |
| 3,178,402 | 4/1965 | Smith et al | 260/94.2 |
| 3,451,459 | 6/1969 | Berilaeque | 152/330 |
| 3,674,078 | 7/1972 | Sasaki et al | 152/330 |

*Primary Examiner*—Clifton B. Cosby
*Attorney, Agent, or Firm*—F. W. Brunner; J. A. Rozmajzl

[57] ABSTRACT

City bus tires having a cap-base construction, and their use first on the front axle of a city bus and subsequently on the rear axle of the bus.

12 Claims, 2 Drawing Figures

INVENTOR
RICHARD M. RUSSELL
BY J.A. Rizmajzl
ATTORNEY

TREADS, PNEUMATIC TIRES AND A PROCESS FOR IMPROVING TIRE PERFORMANCE

This is a continuation of application Ser. No. 869,126 filed Oct. 24, 1969, now abandonded.

This invention relates to tire tread compositions and pneumatic tires for use on city buses. It also relates to a method of impriving the performance of pneumatic city bus tires. More particularly it relates to pneumatic tires possessing treads of a cap-base construction which may be used first on the front axle of city buses and subsequently on the rear axle of the buses.

Buses used strictly for city service encounter road conditions different from vehicles such as passenger cars, trucks and inter city buses. They also travel at speeds seldom exceeding 40 miles per hour. Tires for such buses must therefore be designed with these difference in mind. It is rather standard practice in city bus operations to use tires with rather thick treads having tje same elastomeric composition throughout the tread, heat buildup normally not being much of a problem at the low speeds attained within the city. It is standard practice to first mount these tires on the front axle until the majority of the tread design depth has been removed due to wear. Often the tire is removed when about 4/32 of an inch of the groove depth remains. The tire is then mounted, sometimes after regrooving, on the rear axle of the same bus or a similar bus where it is run to additional mileage. Often the tire is removed when 2/32 of an inch of the regroove depth remains. Improvements here, as in other areas of technology, are desirable, particularly re treadwear performance.

It is an object of this invention to provide an improved tire tread for penumatic city bus tires and pneumatic tires possessing said tread. It is also an object of this invention to provide a method of improving the performance of pneumatic city bus tires. Other objects will appear as the description proceeds.

In the drawing, the single FIG. is a cross sectional view of a tire manufactured in accordance with the present invention.

The present invention provides improved treads which are of a cap-base construction i.e., characterized by an outer, roadcontacting cap, and an underlying base. It also provides pneumatic tires which posses the aforementioned treads. In addition, it provides a method for improving the performance of city bus tires by first mounting the aforementioned tires on the front axle of the bus and operating the bus until the majority of the cap portion is worn away, and then removing the tire from the front axle and placing it on the rear axle of the same bus or a similar bus and operating the bus until the majority of the base portion is worn away.

In accordance with one embodiment of the present invention, the elastomeric portion of the cap is a rubbery composition of (A) from about 80 to 100 parts of a rubbery compolymer of 1,3-butadiene and styrene, and correspondingly (B) from 0 parts to about 20 parts of a second elastomer all parts being by weight per 100 parts by weight of the rubbery composition. Preferably the rubbery composition contains 90 to 100 parts of the butadiene/styrene copolymer and correspondingly 0 to 10 parts of the second elastomer, and most preferably consists essentially of the butadiene/styrene copolymer.

The elastomeric portion of the base is a rubbery composition of (A) from about 50 parts to 100 parts of a cis-1,4 polyisoprene selected from the group consisting of (a) natural rubber and (b) a rubbery synthetic cis-1,4 polyisoprene having in excess of 80 percent of its polymerized monomer units in a cis-1,4 configuration and correspondingly (B) from 0 parts to about 50 parts of a second elastomer, all parts being by weight per 100 parts by weight of the rubber composition. Preferably the rubbery composition contains 70 to 100 parts by weight of the natural rubber and/or synthetic cis-1,4 polyisoprene and correspondingly 0 to 30 parts of the second elastomer, and most preverably consists essentially of all natural rubber.

In another embodiment of the present invention, the cap portion of the tread contains the cis-1,4 polyisoprene-rich rubbery composition as described above in the base and the base portion of the tread contains the butadiene/styrene copolymer-rich rubbery composition as described above in the cap.

Tires possessing treads containing rubbery copolymers of 1,3-butadiene and styrene offer reasonable treadwear properties both on the front axle and rear axle of city buses. Those copolymers by cold emulsion polymerization techniques or by solurtion techniques (commonly known as solution SBR's) offer particularly goo treadwear on both the front and rear axles. However, due to the very thick treads used in high mileage city bus tires and die to the stiffness of butadiene/styrene copolymers and their low tackiness, it is quite difficult to assemble the treads on the tires and difficult to effect an adequate tread splice of the unvulcanized tread where a unit tread construction containing large amounts of butadiene/styrene copolymers are used in high mileage city bus tires. The present invention permits the useage of tread compositions containing large amounts of butadiene/styrene copolymers, since a portion of the tread, either the cap or the base, contains a large amount of a softer, tackier rubber which splices easily. Therefore, by practicing the present invention, rubbery butadiene/styrene copolymers which, if used alone, would result in difficulty in assembling the tire and in open splices in the unvulcanized tread, may be used with no such problems.

The second elastomer in the cap nd the base can be any conventional elastomeric tread stock or mixtures thereof, for example, natural rubber, polychloroprene; homopolymers of isoprene and butadiene, and in particular, polyisoprenes and polybutadienes having essentially all of their repeat units combined in a cis-1,4 structure; and copolymers of isoprene and/or butadiene with up to 50 percent and preferably up to 35 percent by weight of styrene.

City buses, sometimes referred to as transit coaches, include those which are operated primarily on city thoroughfares at speed normally less than 40 miles an hour. They normally seat in the range of 45 to 53 passengers, but may seat more or less. Maximum weights vary, depending on seating capacity and standing capacity. For example, they may range from about 14 to about 16 tons.

The natural rubber to be used within the practice of the present invention is the type normally used in tire tread stocks, e.g., natural rubber possessing a high cis-1,4 content, such as smoked sheets and browns. The term "natural rubber" includes chemically treated natural rubber. Synthetic rubbery high cis-1,4 i.e., in excess of 80 percent, preferably in excess of 90 percent, polyisoprene may be used interchangeably with natural rubber within the practice of the present invention. These synthetic polyisoprenes are prepared by a number of well-known methods, e.g., by solution polymerization of isoprene-1,3 in the presence of organometallic catalysts. These polymers and their preparation are described in the following references:

1. "Synthetic Natural Rubber from Isoprene" Rubber and Plastic Age, Vol. 39, No. 11, page 938 (1958) by Mayor, Saltman and Pierson
2. "Ciss-1,4 Polyisoprene Prepared with Alkyl Aluminim and Titanium Titanium Tetrachloride" Industrial and Engineering Chemistry, Vol. 50 pages 1507-1510 (1958) by Adams, Stearns, Smith and Binder
3. The entry under "Isoprene Polymers" in the Encyclopedia of Polymer Science and Technology, Interscience Publishers, John Wiley and Sons.

The rubbery -1,3 butadiene/styrene copolymers that are useful in the practice of this invention normally posses a bound butadiene content of 50 percent and higher, preferably from about 70 to about 80 percent. They are generally prepared by well known emulsion, free radical polymerization technizues (SBR) of solution techniques (solution SBR). The emulsion polymers include what are commonly referred to as cold SBR and hot SBR, depending on the temperature of polymerization. The cold SBR is normally produced at polymerization temperatures of about 5°C., while the hot SBR is often produced at polymerization temperatures of about 50°C. The cold SBR normally possesses a higher number average molecular weight than hot SBR. The polymers and their preparation are more fully described in *Introduction to Rubber Technology*, by M. Morton, Reinhold, N.Y., pages 256-284 (1959).The solution polymers are prepared using techniques such as those described in U.S. Pat. Nos. 3,294,768; 3,317,918 and 3,324,191.

The rubbery compolymers of butadiene-1,3 and styrnee that are useful in the parctice of the present invention include the oil extended versions of these polymers, which contain petroleum-based rubber processing oils. These oils include parraffinic, naphthenic aromatic, highly aromatic and very high aromatic processing and extending oils and mixtures thereof. SBR-1712 is an example of an oil-extended butadiene/styrene copolymer. With regard to the oil-extended polymers, where ratios and maounts of copolymers of 1,3'-butadiene and styrene are referred to herein, they refer to the ratios and mounts of the rubber hydrocarbon portion, i.e., non-oil portion, of the oil-extended versions.

Whether oil-extended or not, those butadiene/styrene copolymers prepared by cold emulsion and solution techniques operate most effectively within the practice of the present invention.

In accordance with the present invenion the total tread center gauge of the vulcanized tread, i.e., the cap plus base portions, is from about 1.20 inches to about 1.70 inches, preferably from about 1.25 to about 1.50 inches. The tread center gauge of the cap portion is from about 30 percent to aobut 70 percent of the total tread center gauge and preferably from about 40 percent to about 60 percent of the total tread center gauge. The tread center gauge of the base portion constitutes the remainder of the total tread center gauge.

he cap portion ordinarily possesses a tread design made up of various grooved formations. The groove depth of the deeper grooves is normally equal to about 50 percent to 100 percent of the tread center gauge of the cap. In general it is preferred that the amount of cap stock under the deeper original tread grooves be at least 0.1 inch. Preferably the tire is run on the front axle of the bus until shortly before the base portion begins to be exposed or shortly thereafter. For safety reasons it is preferred that some portion of the tread design remain when the tire is moved from a front axle to a rear axle. The tire may be regrooved if desired before mounting on the rear axle.

Figure 2:
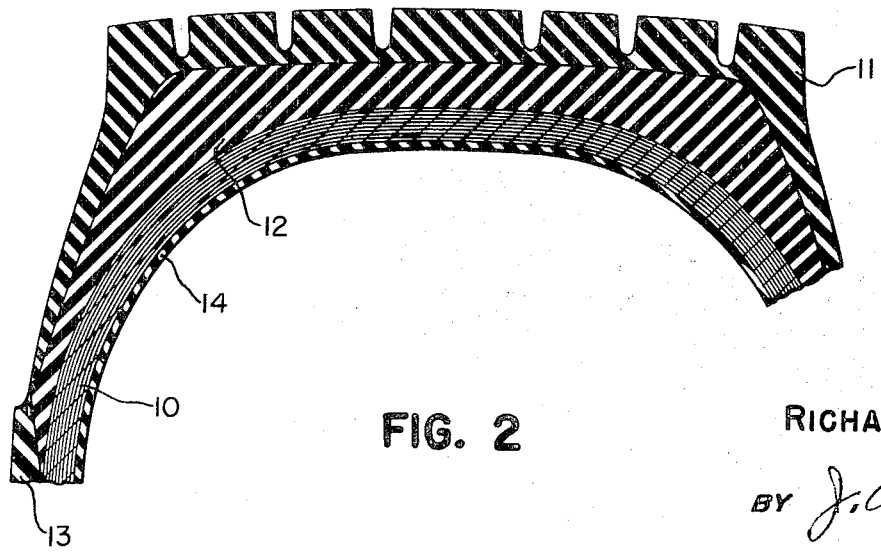

The construction of the treads which are to be formulated in accordance with the present invention may be more readily understood by referring to the attached drawings wherein FIG. 1 is a cross-sectional view of a tire having an improved tread construction showing the cap portion of the tread terminating at the edge of the shoulders. FIG. 2 is another cross-section view of a tire having an improved tread in acccordance with the present invention wherein the cap portion of the tread extends part way up the sides of the tire. In both drawings the tire comprises a carcass 10, a sidewall 13, and a liner 14 with an improved tread composed of a road-contacting portion or cap 11 containing a tractionizing design and a underlying base portion of the tread 12 which will normally be in direct contact with the carcass of the tire and which eventually becomes the road-contacting prtion. The tire may be tubetype or tubeless. Normally the liner is not used in the tube-type. the tire may be constructed in such a manner as to have a cushion and/or breaker strip between the base and carcass.

The dimension C from the top surface of the carcass, or cushion or breaker strip, as the case may be, to the top of the tread is referred to as the "tread center gauge" or "total tread center gauge." The dimension A from the top surface of the base to the top of the tread is referred to as the "tread center gauge of the cap." The dimension B from the top surface of the carcass, or cushion or breaker strip, as the case may be, to the top of the base is referred to as the "tread center gauge of the base."

Tires mounted on the front axle are run to higher tire loads and inflation than tires mounted on the rear axle. Squirming action is also greater on the front axle due to steering. Tires mounted on the rear axle are subject to greater torque since the rear axle is normally the driven axle. Also, since tires are normally dually mounted on rear axles, there can be an effect due to interaction between the tires.

Certain tread compositions offer better treadwear performance as the road-contacting portion of the tread when mounted on the front axle of a city bus, while other tread compositions provide superior performance when acting as the road-contacting portion of the tread when mounted on the rear axle of the bus.

The present invention takes advantage of the fact that butadiene/styrene copolymers offer reasonable treadwear on both the front and rear axles of a city bus, those prepared by cold emulsion and solution polymerization techniques offering particularly good treadwear. The embodiment of the present invention involving the use of a butadiene/styrene-rich composition in the cap and a cis-1,4 polyisoprene-rich composition in the base, also takes advantage of the fact that cis-1,4 polyisoprene performs quite well as a treadstock on the rear axle of city buses.

The rubber compositions contained in the cap and base portions of the tread of the present invention are compounded with conventional amounts of conventional tread compounding ingredients such as carbon blacks, sulfur, asselerators, antioxidants, antiozonants and processing oils and are compounded on and in conventional processing equipment such as rubber mills and Banburies.

The treads may be applied to the tires as a one-piece tread having been previously formulated by simultaneously extruding the cap and base portion of the tread through two different extruders and combining them in the proper proportion in a common extruder head so that the finished cap-base construction is emitted through a single die (equipemnt of this type is commonly referred to as a dual or duples tuber). However, they may also be prepared by extruding the cap and base portion of the tread through two different extruder heads and adhering them together, preferably while they are in a hot freshly extruded condition.

The tires containing the cap-base construction are then mounted on the front axle of the city bus. The tires remain mounted during the operation of the bus until appreciable wear has occurred, normally after road-wear has reduced the tread center gauge of the cap by more than half of its original thickness. For safety reasons the tire is normally removed from the front axle before all of the tread design is removed by wear, normally when approximately 4/32 of an inch of the groove depth remains. The tire is remounted, subsequent to regrooving, if desired, on the rear axle. There, wear occurs during the further operation of the bus, preferably the majority of the wear occurring while the base portion of the tread is exposed, and preferably until roadwear has reduced the tread center gauge of the base by more than half of its oringinal thickness. center gauge of the base by more than half of its orginal thickness. all of the tread design is removed by wear, normally when approximately 2/32 of an inch of the regrooved depth remains.

The practice of this invenion will be more fully understood by reference to the following examples which are illustrative rather than restrictive of the scope of the invention.

Example 1

An 1,100 × 20 city bus tire having a tread of cap-base construction is produced using cold SBR (SBR-1502) as the sole elastomer in the ISAF black loaded cap portion of the tread and using natural rubber (smoked sheets) as the sole elastomer in the ISAF black loaded base portion of the tread. The tread is prepared by extrusion through a 10—10 duplex tuber using a specially designed single die. The unvulcanized green tread has a tread center gauge of about 1.75 1 inches. The tread center gauge in the vulcanized tread for the total tread, the cap and the base are about 1.40, 0.90 and 0.50 respectively.

Example 2

An 1,100 × 20 city bus tire is built as described in Example 1 with the exception that the cold SBR is in the base portion of the tread and the natural rubber is in the cap portion of the tread.

Example 3

A tire of the type described in Example 1 is mounted on the front axle of a city bus and run until the majority of the cap portion is worn away, i.e., until the normal specified removal stage is reached. It is than dual mounted on the rear axle of the same bus, after being regrooved, and the bus operated until the majority of the base portion is worn away, i.e., until the normal specified removal stage is reached. This stage is normally reached when the grooves are worn to about 2/32 of an inch.

Four 1,100 × 20 city bus tires having a construction and composition similar to that described in Example 1 have been made. No splicing difficulty was encountered in building the treads onto the tires. The four tires have been run on the front axle of city buses for approximately 20,000 miles with no splice failures. As controls, four tires possessing a unit tread construction have also been run for approximately 20,000 miles. The unit tread construction contains as its elastomeric portion a 50/25/25 blend of natural rubber, cold SBR and cis-1,4 polybutadiene. The control is considered to possess a fairly effective tread composition for city bus tires. Nonetheless, after approximately 20,000 miles, the tires containing a cap/base construction possess an average treadwear rating of 145 while the unit tread construction possesses an average treadwear rating 100. The thickness, in mils, of tread worn away was determined. The number of miles traveled was then divided by the mils value to provide a miles/mil ration. These ratios were averaged. The treadwear rating for the cap/base construction was calculated by dividing the miles/mil ration for the cap/base construction by the miles/mil ratio for the unit tread construction and muljiplying by 100.

Although the above examples describe the use of a butadiene/styrene copolymer prepared by cold emulsion polymerization techniques, copolymers prepared by hot emulsion or solution techniques can also be used.

While certain representative embodiments and details have been show for the purpose of illustrating the invnetion, it will be apparent to those skilled in this art that various changes and modifications may be made therein without departing from the spirit or scope of the invention.

What is claimed is:

1. A pneumatic tire designed for service on transit coaches which are operated primarily on city thoroughfares having a vulcanized tread, said tread having an outer cap portion and a base portion underlying said cap, wherein the cap containe as SBR-rich composition comprised of
   1. form 80 parts to 100 parts of a rubbery copolymer of 1,3-butadiene and styrene and corespondingly
   2. from 0 part to 20 parts of another conventional elastromeric treadstock, all parts being by weight per 100 parts by weight of the rubbery composition, and wherein the base contains a cis-1,4 polyisoprene-rich composition comprised of
   I. from 50 parts to 100 parts of a cis-1,4 polyisoprene selected from the group consisting of
      a. natural rubber and
      b. a rubbery synthetic cis-1,4 polyisoprene having in excess of 80 percent of its polymerized monomer units in a cis-1,4 configuration and correspondingly 2. for 0 part to 50 parts of another conventional elastomeric treadstock all parts being by weight per 100 parts by weight of the rubbery composition, the other conventional elastomeric treadstock in the SBR-rich and cis-1,4 polyisoprene-rich compositions being selected from the group consisting of natural rubber, polychloroprene, polyisoprene, polybutadiene, copolymers of isoprene and styrene containing up to 50 percent by weight of styrene and copolymers of butadiene and styrene containing up to 50 percent by weight of styrene and wherein the tread center gauge of the cap portion is from 30 percent to 70 percent of the total tread center gauge and wherein the total tread center gauge is from 1.20 to 1.70 inches.

2. The pneumatic city bus tire city bus tire according to claim 1 wherein the total tread center gauge of the tread is from 1.20 to 1.70 inches.

3. The pneumatic city bus tire according to claim 1 wherein the total tread center gauge of the tread is from 1.25 inches to 1.50 inches, and the tread center gauge of the cap portion is from 40 percent to 60 percent of the total tread center gauge.

4. The pneumatic city bus tire according to claim 1 wherein the polyisoprene has in excess of 90 percent of its polymerized momomer units in a cis-1,4 configuration.

5. The pneumatic city bus tire according to claim 1 wherein the rubbery copolymers of butadiene and styrene are prepared by cold emulsion polymerization techniques or solution polymerization techniques.

6. The pneumatic city bus tire according to claim 1 wherein the SBR-rich composition contains from 90 parts to 100 parts of the rubbery copolymer of 1,3-butadiene and styrene, and the cis-1,4 polyisoprene-rich composition contains 70 parts to 100 parts of the cis-1,4 polyisoprene.

7. The pneumatic city bus tire according to claim 1 wherein the SBR-rich composition consists essentially of a rubbery copolymer of butadiene and styrene prepared by cold emulsion polymerization techniques, the cis-1,4 polyisoprene-rich composition consists essentially of cis-1,4 polyisoprene and the total tread center gauge of the tread is from 1.20 to 1.7 inches.

8. The pneumatic city bus tire of claim 7 wherein the rubbery copolymer of butadiene and styrene is free of extending oil and has a bound butadiene content of from about 70 percent to 90 percent, wherein the tire contains a grooved tread design and the amount of cap under the deeper tread grooves is at least 0.10 inch.

9. A method for improving the performance of a pneumatic city bus tire comprising
i. providing the tire with a tread having an outer cap portion and a base portion underlying said cap, wherein the cap contains an SBR-rich composition comprised of
1. from 80 parts to 100 parts of a rubbery copolymer of 1,3-butadiene and styrene and correspondingly
2. from 0 part to 20 parts of another conventional elastomeric treadstock, all parts being by weight per 100 parts by weight of the rubbery composition, and wherein the base contains a cis-1,4 polyisoprene-rich composition comprised of
1. from 50 parts to 100 parts of a cis-1,4 polyisoprene selected from the group consisting of
 a. natural rubber and
 b. a rubbery synthetic cis-1,4 polyisoprene having in excess of 80 percent of its polymerized monomer units in a cis-1,4 configuration and correspondingly
2. form 0 part to 50 parts of another conventional elastomeric treadstock, all parts being by weight per 100 parts by weight of the rubbery composition,
the other conventional elastomeric treadstock in the SBR-rich and cis-1,4 polyisoprene-rich compositions being selected from the group consisting of natural rubber, polychloroprene, polyisoprene, polybutadiene, copolymers of isoprene and styrene containing up to 50 percent by weight of styrene and copolymers of butadiene and styrene containing up to 50 percent by weight of styrene and wherein the tread center gauge of the cap portion is from 30 percent to 70 percent of the total tread center gauge,
ii. mounting the tire on the front axle of the bus,
iii. running the tire on the front axle until roadwear has reduced the tread center gauge of the cap by more than half of its original thickness,
iv. remounting the tire on the rear axle of a bus, and
v. running the tire on the rear axle until roadwear has reduced the tread center gauge of the base by more than halfof its original thickness.

10. The method according to claim 9 wherein subsequent to running the tire on the front axle and prior to remounting the tire on the rear asle, the tire tread is re-grooved.

11. The method according to claim 9 wherein the tire is run on the front axle until roadwear has reduced the remaining groove depth in the tread to 4/32 of an inch and wherein the tire is subsequently run on the rear axle until roadwear has reduced the remaining groove depth to 2/32 of an inch.

12. The method according to claim 9 wherein the tire is run on the front axle until roadwear has essentially entirely worn away the cap portion.

* * * * *

UNITED STATES PATENT OFFICE

CERTIFICATE OF CORRECTION

Patent No. 3,830,275     Dated August 20, 1974

Inventor(s) Richard M. Russell

It is certified that error appears in the above-identified patent and that said Letters Patent are hereby corrected as shown below:

```
Col. 1, line 20, "tje" should read -- the --.
Col. 2, line 11, "preverably" should read -- preferably --;
        line 22, after "copolymers" insert -- prepared by --;
        line 25, "goo" should read -- good --;
        line 27, "die" should read -- due --;
        line 44, "nd" should read -- and --;
        line 54, "speed" should read -- speeds --.
Col. 3, line 10, "Ciss-1,4" should read -- Cis-1,4 --;
        line 11, "Aluminim" should read -- Aluminum --;
                 "Titanium", second occurrence, should be
                 deleted.
        line 20, "posses" should read -- possess --;
        line 38, "compolymers" should read -- copolymers --;
        lines 38 and 39, "styrnee" should read -- styrene --;
        line 39, "parctice" should read -- practice --;
        line 47, "maounts" should read -- amounts --;
        line 49, "mounts" should read -- amounts --;
        line 56, "invenion" should read -- invention --;
        line 62, "aobut" should read -- about --;
        line 67, "he" should read -- The --.
Col. 4, line 29, "prtion" should read -- portion --.
Col. 5, line 7, "asselerators" should read -- accelerators --;
        line 17, "equipemnt" should read -- equipment --;
        line 18, "duples" should read -- duplex --;
        lines 40 and 41, delete "center gauge of the base by
                 more than half of its original thickness"
                 and insert -- If regrooved, the tire is
                 normally removed from the rear axle before --;
        line 58, before "inches" delete "1".
Col. 6, line 6, "than" should read -- then --;
        line 31, "ration" should read -- ratio --;
        line 34, "ration" should read -- ratio --;
        line 36, "muljiplying" should read -- multiplying --;
        line 45, "invnetion" should read -- invention --.
```

PO-1050
(5/69)

Page 2

UNITED STATES PATENT OFFICE
CERTIFICATE OF CORRECTION

Patent No. 3,830,275                    Dated August 20, 1974

Inventor(s) Richard M. Russell

It is certified that error appears in the above-identified patent and that said Letters Patent are hereby corrected as shown below:

Col. 6, line 54, "containe" should read -- contains --; "as" should read -- an --;
      line 59, "elastromeric" should read -- elastomeric --.
Col. 7, line 3, "for" should read -- from --;
      line 18, delete "city bus tire" second occurrence;
      line 46, "1.7" should read -- 1.70 --.
Col. 8, line 18, "form" should read -- from --;
      line 45, "asle" should read -- axle --.

Signed and sealed this 17th day of December 1974.

(SEAL)
Attest:

McCOY M. GIBSON JR.            C. MARSHALL DANN
Attesting Officer            Commissioner of Patents